US012012802B2

(12) United States Patent
Wang et al.

(10) Patent No.: US 12,012,802 B2
(45) Date of Patent: Jun. 18, 2024

(54) SOUNDPROOF DOOR SYSTEM

(71) Applicant: State Grid Henan Electric Power Research Institute, Henan (CN)

(72) Inventors: Donghui Wang, Henan (CN); Songyang Zhang, Henan (CN); Leilei Wang, Henan (CN); Zhuangzhuang Zhang, Henan (CN); Guangzhou Wang, Henan (CN); Xing Guo, Henan (CN); Yuan Li, Henan (CN); Xu Tian, Henan (CN); Weipo Liu, Henan (CN); Zhongbin Lv, Henan (CN); Jinfeng Geng, Henan (CN); Degui Yao, Henan (CN)

(73) Assignee: State Grid Henan Electric Power Research Institute, Zhengzhou (CN)

( * ) Notice: Subject to any disclaimer, the term of this patent is extended or adjusted under 35 U.S.C. 154(b) by 37 days.

(21) Appl. No.: 18/052,203

(22) Filed: Nov. 2, 2022

(65) Prior Publication Data

US 2023/0112167 A1 Apr. 13, 2023

Related U.S. Application Data

(63) Continuation-in-part of application No. PCT/CN2022/080949, filed on Mar. 15, 2022.

(30) Foreign Application Priority Data

Aug. 25, 2021 (CN) ......................... 202110981756.9

(51) Int. Cl.
*E06B 5/20* (2006.01)
*E05D 15/06* (2006.01)
(Continued)

(52) U.S. Cl.
CPC ............ *E06B 5/20* (2013.01); *E05D 15/0665* (2013.01); *E06B 3/4654* (2013.01);
(Continued)

(58) Field of Classification Search
CPC ............ E05D 15/0686; E05D 15/0665; E05Y 2600/452; E06B 5/20; E06B 7/2316; E06B 7/26
See application file for complete search history.

(56) References Cited

U.S. PATENT DOCUMENTS 5,083,639 A * 1/1992 Kappeler .............. B66B 13/308
187/324
2008/0016771 A1* 1/2008 Marchetto .......... G07C 9/00182
340/13.24
(Continued)

FOREIGN PATENT DOCUMENTS

CN 107269147 A 10/2017
CN 206922204 U 1/2018
(Continued)

*Primary Examiner* — Marcus Menezes

(57) ABSTRACT

A soundproof door system includes a chute; a door body, where a bottom of the door body is inserted into the chute and able to slide along the chute; a first roller disposed on the bottom of the door body and supported on a bottom wall of the chute; a first soundproof plate provided with a first end connected to the door body and a second end abutting against an inner wall of the chute; a second soundproof plate provided with a third end connected to the door body and a fourth end abutting against the inner wall of the chute; and the first end and the third end are respectively located on two sides of the door body, and the second end and the fourth end are respectively located on both sides of the door body.

10 Claims, 10 Drawing Sheets

(51) Int. Cl.

| | |
|---|---|
| ***E06B 3/46*** | (2006.01) |
| ***E06B 7/23*** | (2006.01) |
| ***E06B 7/26*** | (2006.01) |
| *E05F 15/652* | (2015.01) |

(52) U.S. Cl.

CPC .............. *E06B 7/2316* (2013.01); *E06B 7/26* (2013.01); *E05F 15/652* (2015.01); *E05Y 2201/434* (2013.01); *E05Y 2201/684* (2013.01); *E05Y 2201/688* (2013.01); *E05Y 2201/702* (2013.01); *E05Y 2900/11* (2013.01)

(56) References Cited

U.S. PATENT DOCUMENTS

2015/0121764 A1* 5/2015 Lee ..................... E05D 15/0686 49/420
2015/0354258 A1* 12/2015 Geysels .............. E05D 15/0665 49/506
2019/0383078 A1* 12/2019 Tsimbikos ............ E06B 3/5454
2020/0357373 A1 11/2020 Hall et al.

FOREIGN PATENT DOCUMENTS

CN 109322599 A 2/2019
CN 209067062 U 7/2019
CN 112854991 A 5/2021
EP 1953326 A1 8/2008

* cited by examiner

SOUNDPROOF DOOR SYSTEM

CROSS REFERENCE TO RELATED APPLICATIONS

The present application is a Continuation-In-Part Application of PCT Application No. PCT/CN2022/080949 filed on Mar. 15, 2022, which claims the benefit of Chinese Patent Application No. 202110981756.9 filed on Aug. 25, 2021. All the above are hereby incorporated by reference in their entirety.

TECHNICAL FIELD

The present disclosure relates to the technical field of soundproof devices, and more specifically, to a soundproof door system.

BACKGROUND

A transformer and other sound source devices in a power facility such as a substation or a thermal power plant are prone to generate noise during operation, and have a great impact on a surrounding environment, seriously affecting production and life of surrounding residents.

In order to reduce propagation of the noise, soundproof doors are usually used to reduce the noise, for example, a ventilated soundproof door for an indoor substation in the Chinese patent CN109322599A. However, there is usually a gap between the soundproof door and the ground, and some noise can easily bypass a door body from the bottom of the door body.

SUMMARY

The present disclosure is intended to provide a soundproof door system to resolve a prior-art technical problem that noise can easily bypass a door body from the bottom of the door body.

To achieve the above objective, the present disclosure adopts the following technical solution: A soundproof door system is provided, including:

- a chute formed on a ground, where the chute extends along an extension direction of a first horizontal straight line;
- a door body, where a bottom of the door body is inserted into the chute and able to slide along the chute, and a top of the door body is above the ground;
- a first roller disposed on the bottom of the door body and supported on a bottom wall of the chute;
- a first soundproof plate provided with a first end connected to the door body and a second end abutting against an inner wall of the chute; and
- a second soundproof plate provided with a third end connected to the door body and a fourth end abutting against the inner wall of the chute; where
- in an extension direction a second horizontal straight line perpendicular to the extension direction of the first horizontal straight line, the first soundproof plate and the second soundproof plate are respectively located on two sides of the door body.

Further, the door body, the first soundproof plate, and the second soundproof plate each extend along an extension direction of the chute.

Further, the door body, the first soundproof plate, the second soundproof plate, and the inner wall of the chute enclose a sealing space.

Further, both the first soundproof plate and the second soundproof plate are rubber plates.

Further, the first soundproof plate includes: a plurality of first sub-plates arranged along an extension direction of the chute sequentially and connected end to end sequentially; for any two adjacent ones of the first sub-plates, one first sub-plate is provided with a first protrusion, and the other first sub-plate is provided with a first recess; and the first protrusion is inserted on the first recess; and/or

- the second soundproof plate includes: a plurality of second sub-plates arranged along the extension direction of the chute sequentially and connected end to end sequentially; for any two adjacent ones of the second sub-plates, one second sub-plate is provided with a second protrusion, and the other second sub-plate is provided with a second recess; and the second protrusion is inserted on the second recess.

Further, the soundproof door system further includes:

- a first support disposed on the door body;
- a second support disposed on the door body;
- a first slide rail disposed on the ground;
- a second slide rail disposed on the ground;
- a second roller disposed on a bottom of the first support and slidably provided on the first slide rail; and
- a third roller disposed on a bottom of the second support and slidably provided on the second slide rail; where
- in the extension direction of the second horizontal straight line perpendicular to the extension direction of the first horizontal straight line, the first support and the first slide rail are located on one side of the door body, and the second support and the second slide rail are located on the other side of the door body.

Further, the soundproof door system further includes:

- a sliding plate connected to one end of the door body and disposed along the chute; and
- a plurality of fourth rollers disposed at a bottom of the sliding plate; where
- the chute is a T-shaped groove; the chute includes a longitudinal groove and a transverse groove located on a top of the longitudinal groove; the sliding plate is slidably provided in the transverse groove; at least two of the fourth rollers are supported on a first bottom wall of the transverse groove on one side of the longitudinal groove, and at least the other two of the fourth rollers are supported on a second bottom wall of the transverse groove on the other side of the longitudinal groove.

Further, the soundproof door system further includes:

- a baffle detachably fixed on the top of the door body, where a top of the baffle bends towards one side of the door body.

Further, the soundproof door system further includes:

- two soundproof walls sequentially disposed at intervals along an extension direction of the chute, where a distance between the two soundproof walls is less than a length of the door body, where
- each of the soundproof walls includes: a first wall extending along the extension direction of the first horizontal straight line, a second wall extending along the extension direction of the first horizontal straight line, a first rubber layer laid on a side of the first wall, and a second rubber layer laid on a side of the second wall; in the extension direction of the second horizontal straight line, the first wall, the first rubber layer, the second rubber layer, and the second wall are sequentially disposed; and in the extension direction of the second horizontal straight line, a gap is formed between the first rubber layer and the second rubber layer to clamp the door body.

Further, the soundproof door system further includes:

a driver configured to drive the door body to move along the chute, where the driver is disposed on the ground.

The soundproof door system provided the present disclosure has the following beneficial effects: Compared with the prior art, the soundproof door system provided in the present disclosure is provided with the chute on the ground, and the bottom of the door body is inserted into the chute. The bottom of the door body is provided with the first roller, and the bottom of the door body is disposed on the bottom wall of the chute in a rolling manner through the first roller, in other words, the door body can slide along the chute through the first roller. In the extension direction of the second horizontal straight line perpendicular to the extension direction of the first horizontal straight line, one side of the door body is provided with the first soundproof plate, and the other side of the door body is provided with the second soundproof plate. The first soundproof plate has the first end and the second end, the first end of the first soundproof plate is connected to the door body, and the second end of the first soundproof plate abuts against the inner wall of the chute. The second soundproof plate has the third end and the fourth end, the third end of the second soundproof plate is connected to the door body, and the fourth end of the second soundproof plate abuts against the inner wall of the chute. In this way, when some sound waves bypass the door body from the bottom of the door body, the sound waves are blocked by the first soundproof plate and the second soundproof plate, thus reducing intensity of the sound waves bypassing the door body from the bottom of the door body.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description merely show some embodiments of the present disclosure, and persons of ordinary skill in the art may still derive other accompanying drawings from these accompanying drawings without creative efforts.

In the figures.

Figure 1:
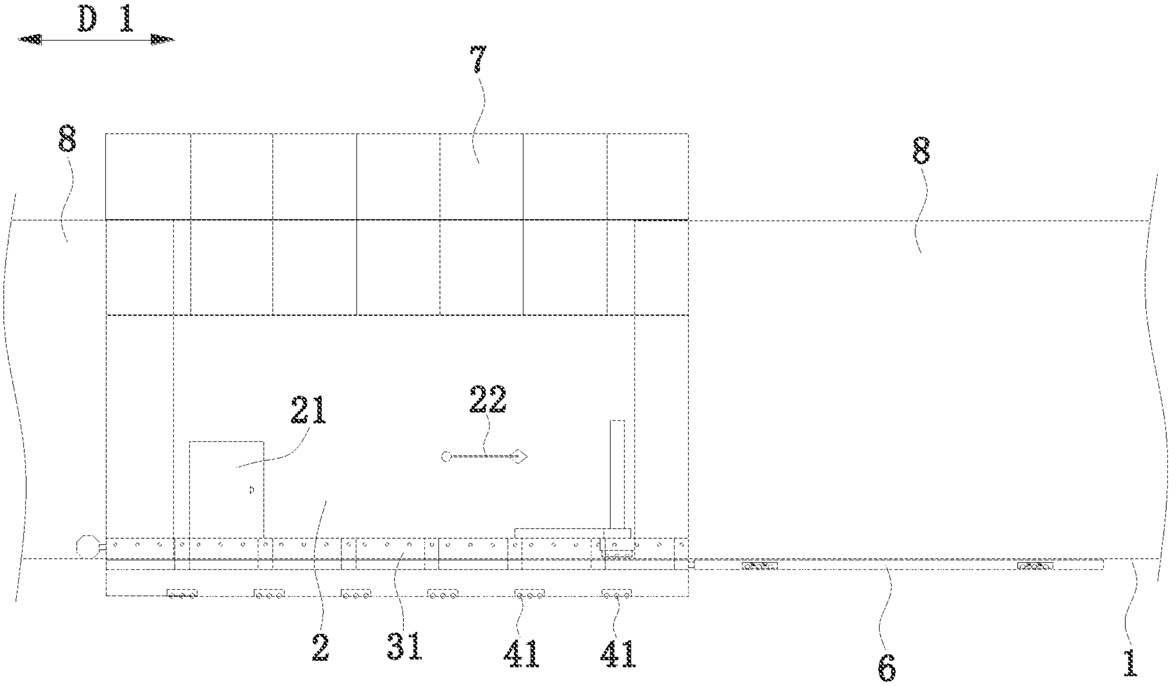
FIG. 1 is a front view of cooperation of a soundproof door system and a soundproof wall according to an embodiment of the present disclosure.

1: ground; 11: chute; 111: transverse groove; 1111: first bottom wall; 1112: second bottom wall; 112 longitudinal groove; 2: door body; 21: sub-door; 22: sound level meter; 23: U-shaped cavity; 31: first soundproof plate; 311: first end; 312 second end; 313: first sub-plate; 3131: first protrusion; 3132: first recess; 32: second soundproof plate; 321: third end; 322: fourth end; 323: second sub-plate; 3231: second protrusion; 3232: second recess; 41: first roller; 42: second roller; 43: third roller; 44: fourth roller; 51: first support; 52: first slide rail; 53: second support; 54: second slide rail; 6: sliding plate; 7: baffle; 8: soundproof wall; 81: first wall; 82: second wall; 83: first rubber layer; 84 second rubber layer; 85 gap; 9: driver; D1: extension direction of a first horizontal straight line; D2: extension direction of a second horizontal straight line.

DETAILED DESCRIPTION

To make the to-be-resolved technical problems, the technical solutions, and the beneficial effects of the present disclosure clearer, the present disclosure is described in further detail below with reference to the accompanying drawings and embodiments. Understandably, the specific embodiments described herein are merely intended to explain the present disclosure but not to limit the present disclosure.

It should be noted that when a component is "fixed" or "provided" on another component, the component may be "fixed" or "provided" on the another component directly or indirectly. When a component is "connected" to another component, the component may be "connected" to the another component directly or indirectly.

It should be noted that, in the description of the embodiments of the present disclosure, unless otherwise specified, "/" means "or", for example, "A/B" may mean "A or B". The term "and/or" herein merely describes an association relationship between associated objects, and it indicates three types of relationships. For example, "A and/or B" may indicate that "A exists alone", "A and B coexist" and "B exists alone". "A" and "B" each may be singular or plural.

It should be understood that orientations or position relationships indicated by terms "length", "width", "upper", "lower", "front", "rear", "left", "right", "vertical", "horizontal", "top", "bottom", "inside", "outside", and the like are based on the orientation or position relationships shown in the accompanying drawings. These terms are just used to facilitate the description of the present disclosure and simplify the description, but not to indicate or imply that the mentioned device or elements must have a specific orientation and must be established and operated in a specific orientation, and thus these terms cannot be understood as a limitation to the present disclosure.

Moreover, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, "a plurality of" means two or more, unless otherwise specifically defined.

Figure 4:
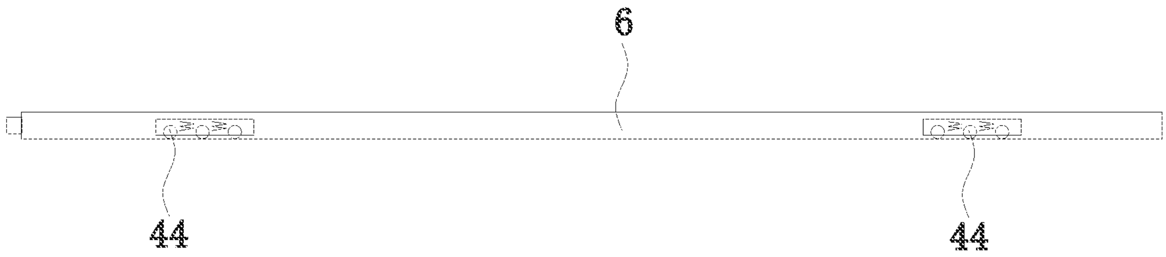
FIG. 4 is a front view of a sliding plate in FIG. 1 according to an embodiment of the present disclosure.
Figure 5:
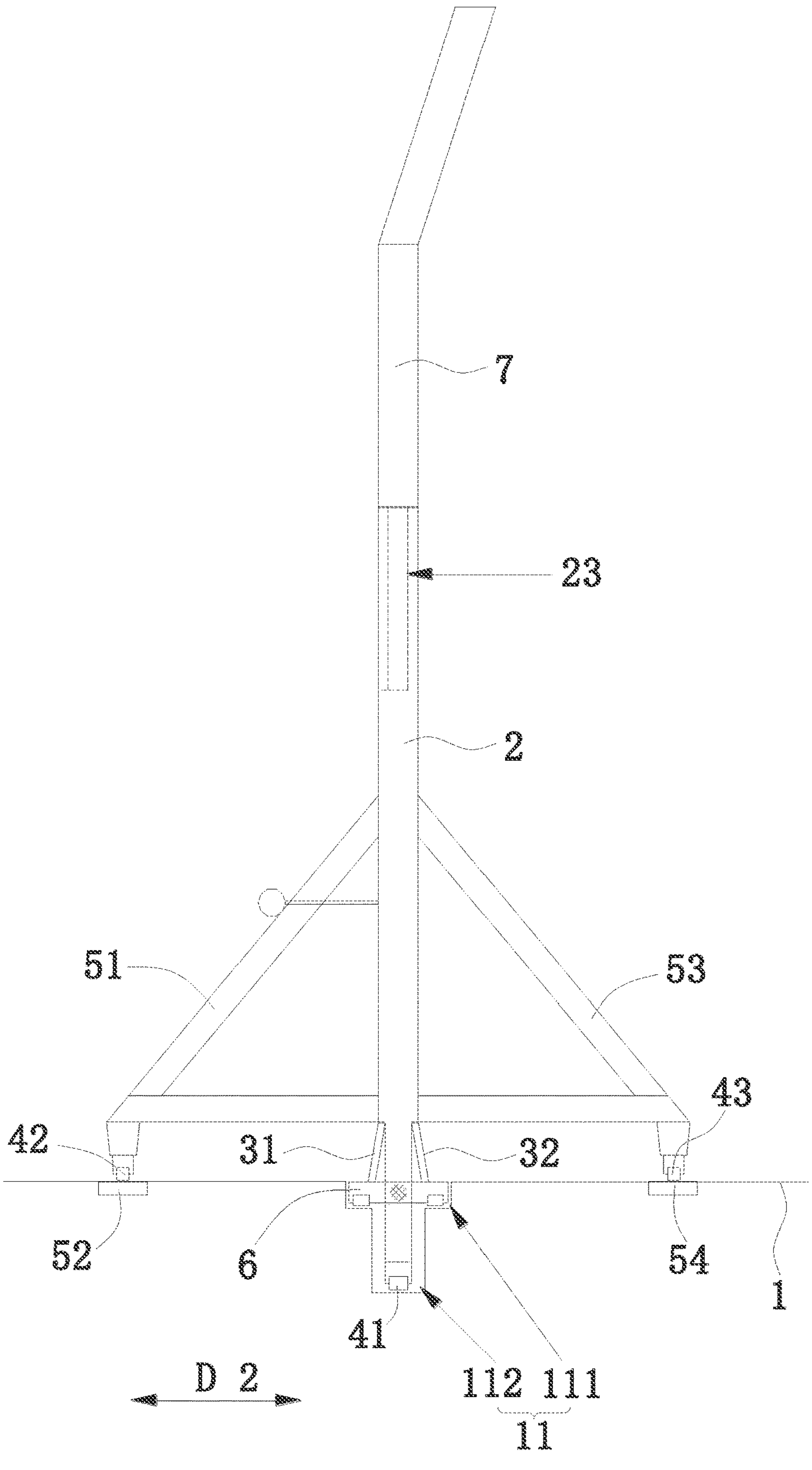
FIG. 5 is a right view of the soundproof door system in FIG. 1 according to an embodiment of the present disclosure.

As shown in FIG. 1, FIG. 4, and FIG. 5, a soundproof door system in the present disclosure is described. The soundproof door system includes: a chute 11 formed on a ground 1, a door body 2, a first roller 41, a first soundproof plate 31, and a second soundproof plate 32. The chute 11 extends along an extension direction D1 of a first horizontal straight line. A bottom of the door body 2 is inserted into the chute 11 and can slide along the chute 11, and a top of the door body 2 is above the ground 1. The first roller 41 is disposed on the bottom of the door body 2 and supported on a bottom wall of the chute 11. The first soundproof plate 31 is provided with a first end 311 connected to the door body 2 and a second end 312 abutting against an inner wall of the chute 11. The second soundproof plate 32 is provided with a third end 321 connected to the door body 2 and a fourth end 322 abutting against the inner wall of the chute 11. In an extension direction D2 of a second horizontal straight line perpendicular to the extension direction D1 of the first horizontal straight line, the first soundproof plate 31 and the second soundproof plate 32 are respectively located on two sides of the door body 2.

In this way, the chute 11 is disposed on the ground 1, and the bottom of the door body 2 is inserted into the chute 11. The bottom of the door body 2 is provided with the first roller 41, and the bottom of the door body 2 is disposed on the bottom wall of the chute 11 in a rolling manner through the first roller 41, in other words, the door body 2 can slide along the chute 11 through the first roller 41. In the extension direction D2 of the second horizontal straight line perpendicular to the extension direction D1 of the first horizontal straight line, one side of the door body 2 is provided with the first soundproof plate 31, and the other side of the door body 2 is provided with the second soundproof plate 32. The first soundproof plate 31 has the first end 311 and the second end 312, the first end 311 of the first soundproof plate 31 is connected to the door body 2, and the second end 312 of the first soundproof plate 31 abuts against the inner wall of the chute 11. The second soundproof plate 32 has the third end 321 and the fourth end 322, the third end 321 of the second soundproof plate 32 is connected to the door body 2, and the fourth end 322 of the second soundproof plate 32 abuts against the inner wall of the chute 11. In this way, when some sound waves bypass the door body 2 from the bottom of the door body 2, the sound waves are blocked by the first soundproof plate 31 and the second soundproof plate 32, thus reducing intensity of the sound waves bypassing the door body 2 from the bottom of the door body 2.

In an embodiment, the door body 2 is provided with a sub-door 21 to a user to access.

In an embodiment, the ground 1 may be a plane formed through cement pouring.

In an embodiment, the first end 311 and the third end 321 are respectively located on the two sides of the door body 2, and the second end 312 and the fourth end 322 are respectively located on the two sides of the door body 2.

In an embodiment, the door body 2 is usually a cuboid plate placed vertically. In an embodiment, a length of the door body 2 is greater than a thickness of the door body 2. The extension direction D2 of the second horizontal straight line is a thickness direction of the door body 2. The extension direction D1 of the first horizontal straight line is a length direction of the door body 2.

Further, referring to FIG. 1 to FIG. 6, in a specific implementation of the soundproof door system provided in the present disclosure, the door body 2, the first soundproof plate 31, and the second soundproof plate 32 each extend along an extension direction of the chute 11. In this way, sound is prevented from being transmitted from one side of the door body 2 to the other side.

Figure 6:
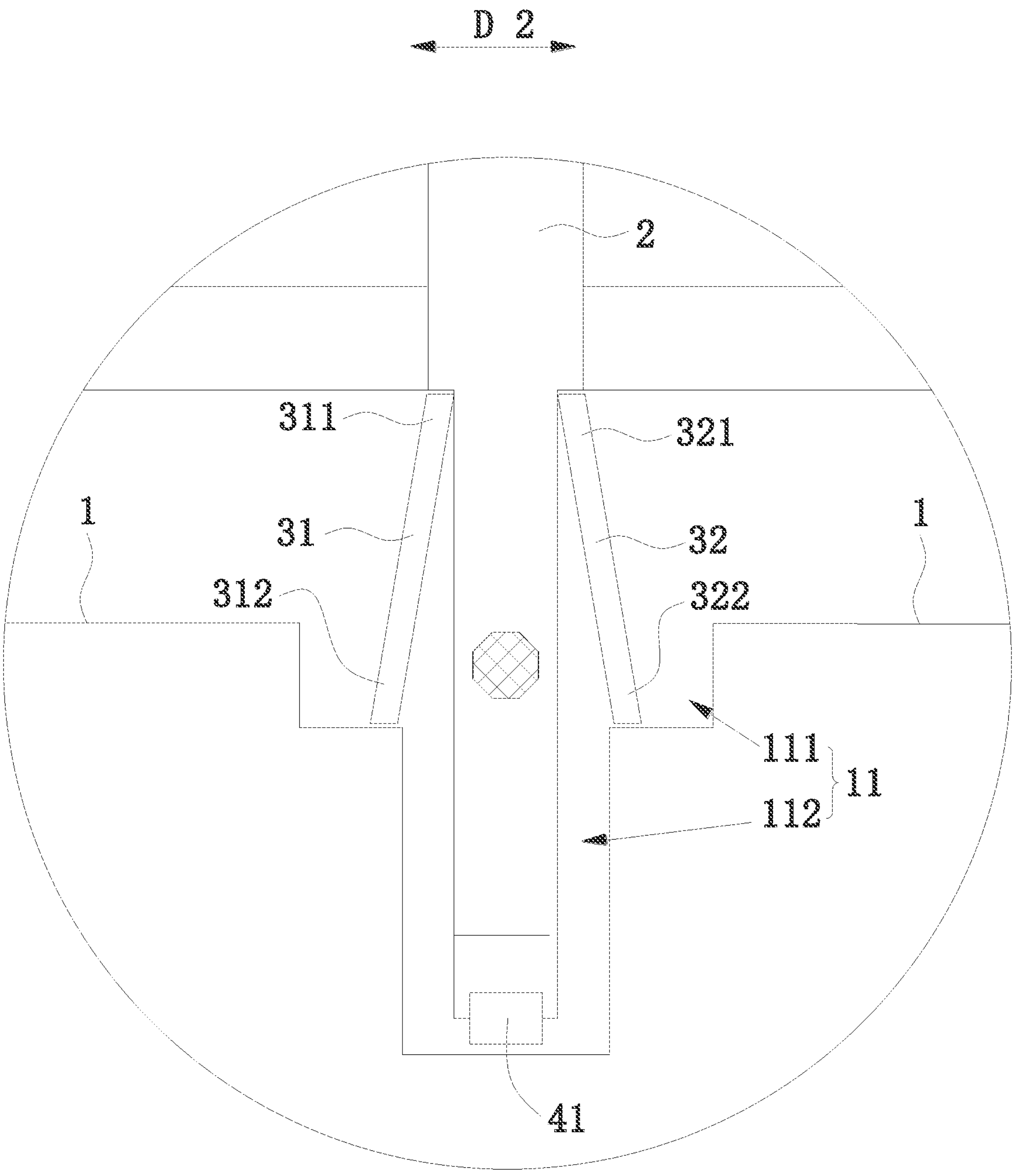
FIG. 6 is a schematic diagram of a first soundproof plate, a door body, and a second soundproof plate in FIG. 5 according to an embodiment of the present disclosure.

Further, referring to FIG. 6, in a specific implementation of the soundproof door system provided in the present disclosure, the door body 2, the first soundproof plate 31, the second soundproof plate 32, and the inner wall of the chute 11 enclose a sealing space. In this way, sound waves on the two sides of the door body 2 cannot easily cross the space at the bottom of the door body 2.

Further, in a specific implementation of the soundproof door system provided in the present disclosure, both the first soundproof plate 31 and the second soundproof plate 32 are rubber plates. In this way, the rubber plate has good toughness and good sound insulation effect.

Figure 9:
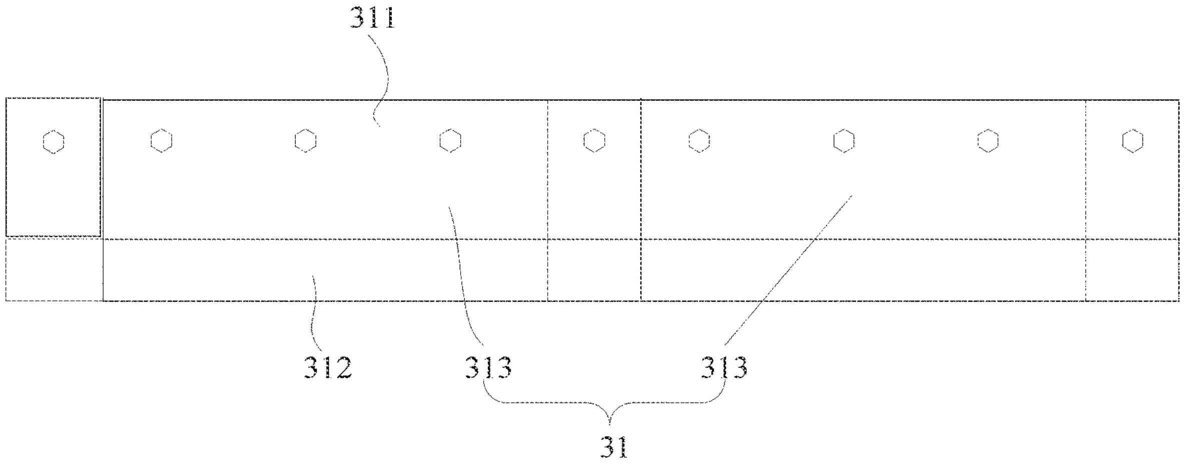
FIG. 9 is a front view of the first soundproof plate in FIG. 6 according to an embodiment of the present disclosure.
Figure 10:
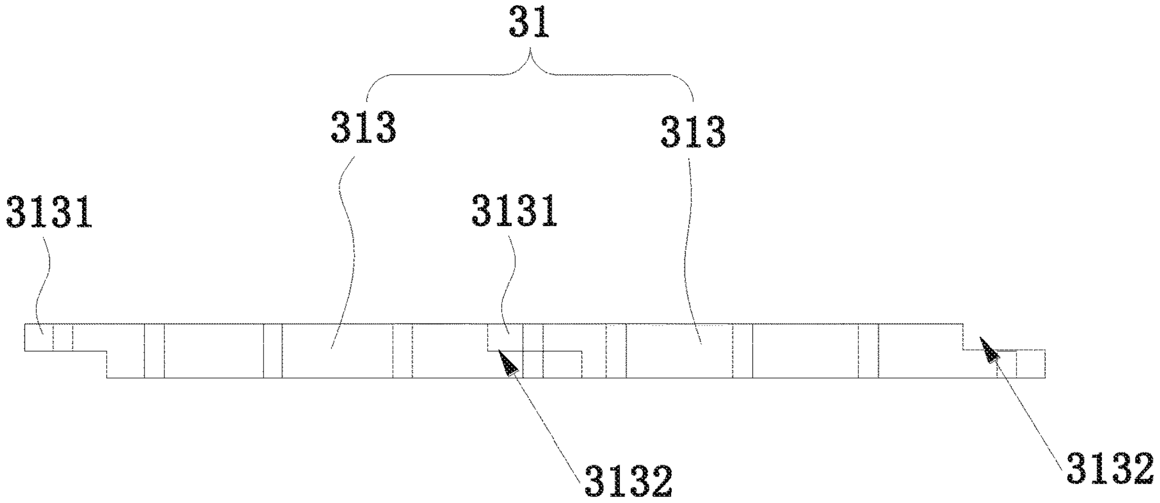
FIG. 10 is a top view of the first soundproof plate in FIG. 6 according to an embodiment of the present disclosure.

Further, referring to FIG. 9 and FIG. 10, in a specific implementation of the soundproof door system provided in the present disclosure, the first soundproof plate 31 includes: a plurality of first sub-plates 313 arranged along the extension direction of the chute 11 sequentially and connected end to end sequentially; for any two adjacent ones of the first sub-plates 313, one first sub-plate 313 is provided with a first protrusion 3131, and the other first sub-plate 313 is provided with a first recess 3132; and the first protrusion 3131 is inserted on the first recess 3132. In this way, for any two adjacent ones of the first sub-plates 313, the first recess 3132 on one first sub-plate 313 is clamped with the first protrusion 3131 of the other sub-plate, which is more secure.

Figure 11:
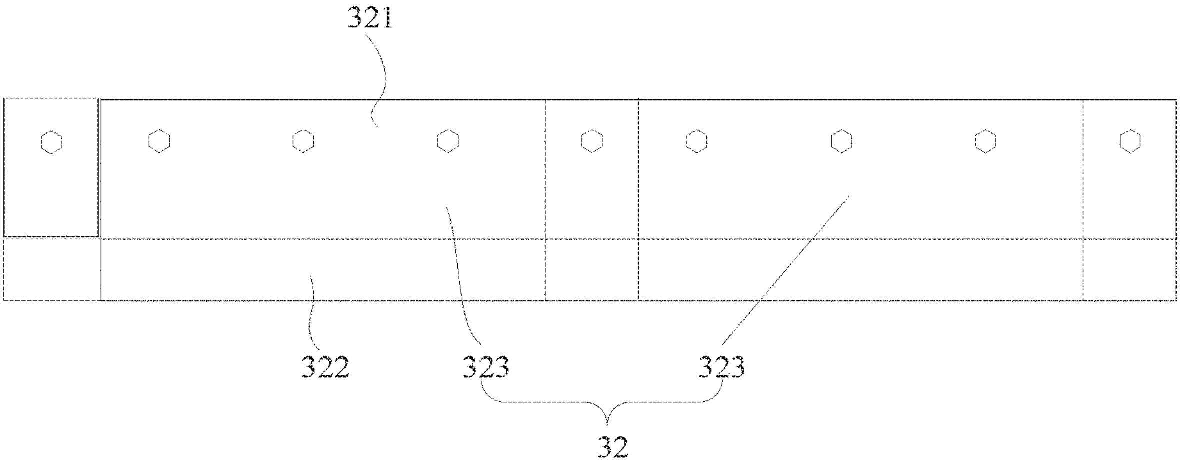
FIG. 11 is a front view of the second soundproof plate in FIG. 6 according to an embodiment of the present disclosure.
Figure 12:
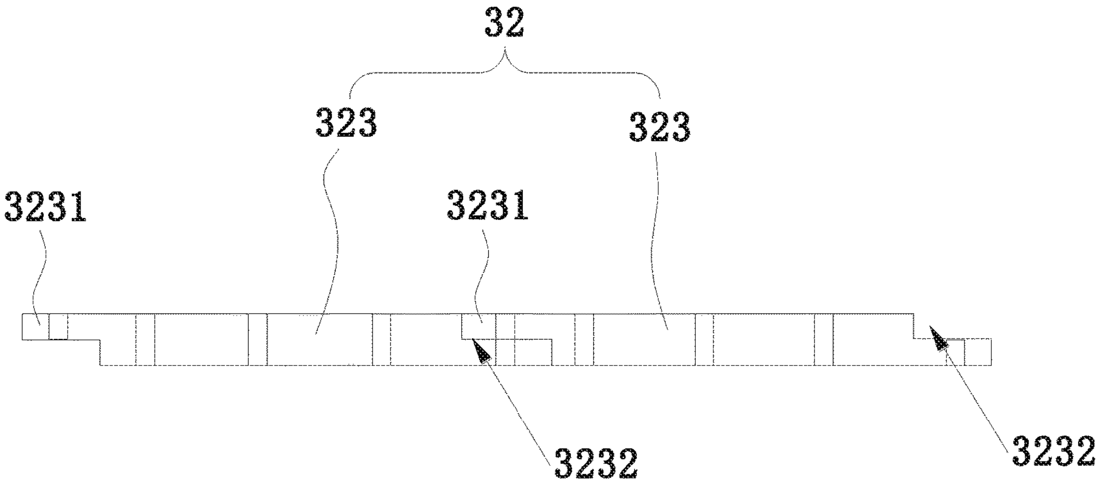
FIG. 12 is a top view of the second soundproof plate in FIG. 6 according to an embodiment of the present disclosure.

Referring to FIG. 11 and FIG. 12, in an embodiment, the second soundproof plate 32 includes: a plurality of second sub-plates 323 arranged along the extension direction of the chute 11 sequentially and connected end to end sequentially; for any two adjacent ones of the second sub-plates 323, one second sub-plate 323 is provided with a second protrusion 3231, and the other second sub-plate 323 is provided with a second recess 3232; and the first protrusion 3231 is inserted on the first recess 3232. In this way, for any two adjacent ones of the second sub-plates 323, the second recess 3232 on one second sub-plate 323 is clamped with the second protrusion 3231 of the other sub-plate, which is more secure.

Further, referring to FIG. 5, in a specific implementation of the soundproof door system provided in the present disclosure, the soundproof door system further includes: a first support 51, a second support 53, a first slide rail 52, a second slide rail 54, a second roller 42, and a third roller 43. The first support 51 is disposed on the door body 2. The second support 53 is disposed on the door body 2. The first slide rail 52 is disposed on the ground 1. The second slide rail 54 is disposed on the ground 1. The second roller 42 is disposed on a bottom of the first support 51 and can roll along the first slide rail 52. The third roller 43 is disposed on a bottom of the second support 53 and can roll along the second slide rail 54. The first support 51 and the first slide rail 52 are located on one side of the door body 2, and the second support 53 and the second slide rail 54 are located on the other side of the door body 2. In this way, the door body 2 can be supported on the first slide rail 52 through the first support 51 and the second roller 42, and the door body 2 can be supported on the second slide rail 54 through the second support 53 and the third roller 43. In the extension direction D2 of the second horizontal straight line, the first support 51 and the second support 53 are respectively located on the opposite two sides of the door body 2, such that the first support 51 and the second support 53 support the door body 2 from the two sides of the door body 2.

Figure 7:
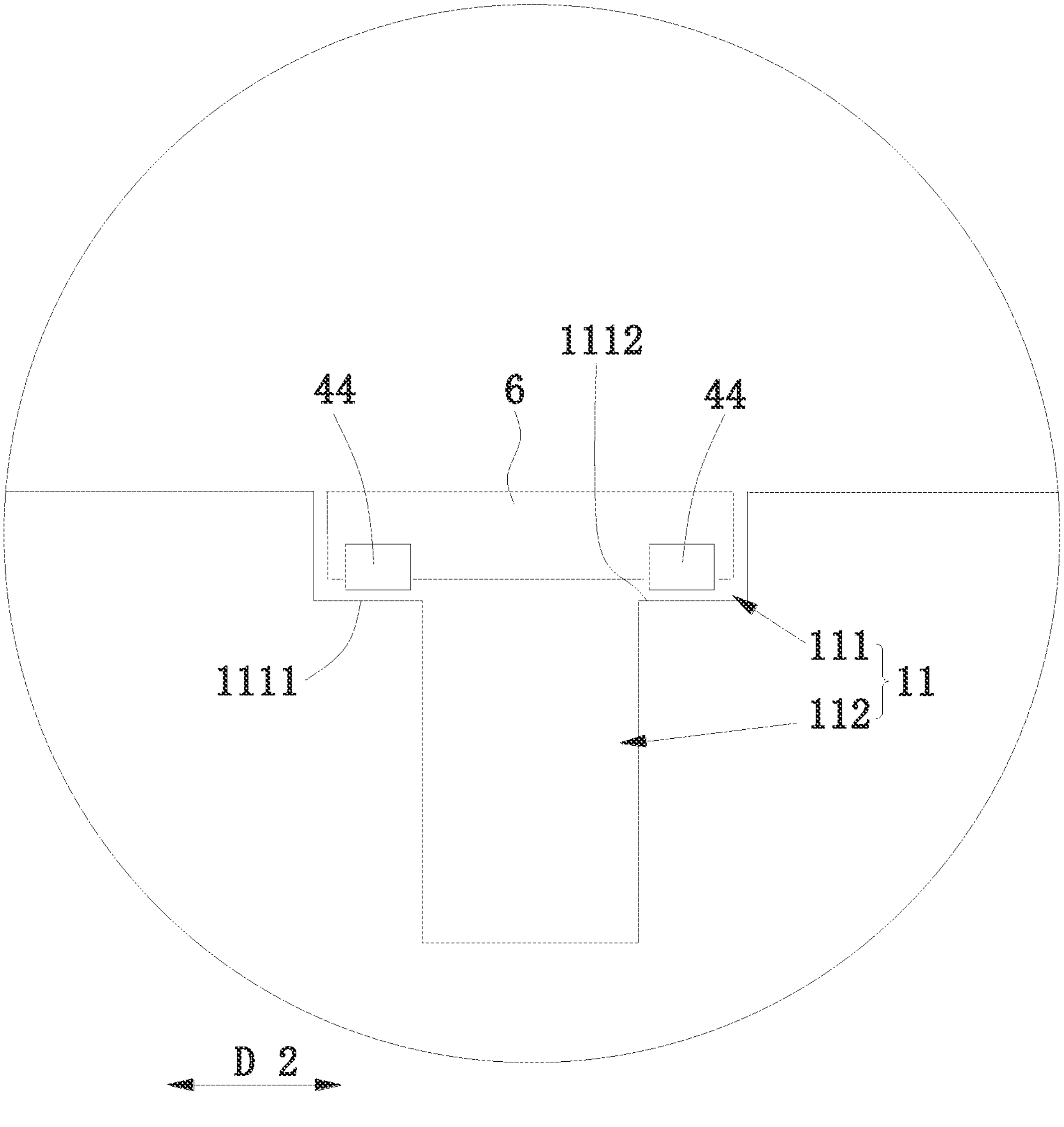
FIG. 7 is a right view of a sliding plate installed in a chute in FIG. 5 according to an embodiment of the present disclosure.
Figure 8:
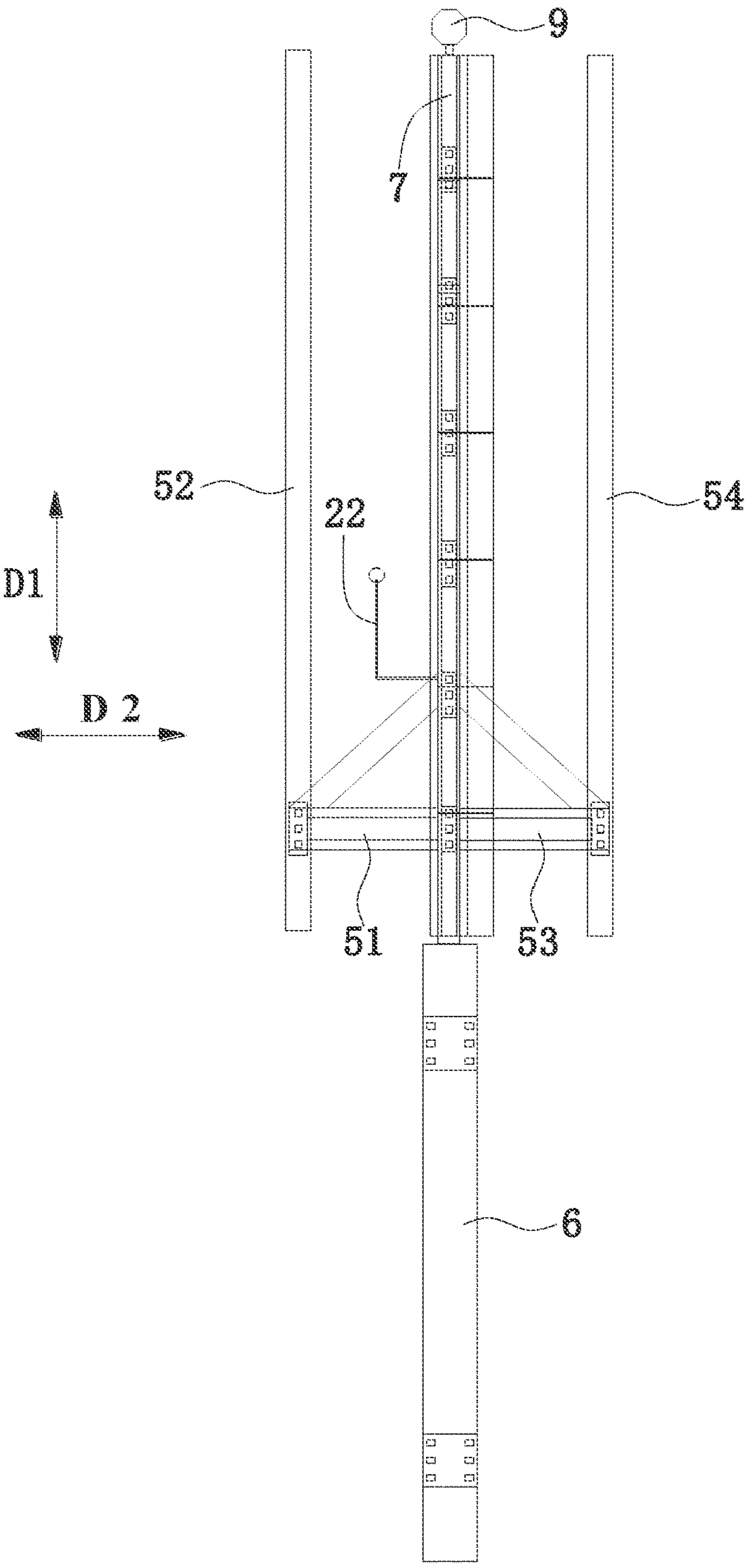
FIG. 8 is a top view of the soundproof door system in FIG. 1 according to an embodiment of the present disclosure.

Further, referring to FIG. 4, FIG. 5, and FIG. 7, in a specific implementation of the soundproof door system provided in the present disclosure, the soundproof door system further includes a sliding plate 6 and a plurality of fourth rollers 44. The sliding plate 6 is connected to one end of the door body 2 and disposed along the chute 11. The fourth rollers 44 are disposed at a bottom of the sliding plate 6. Referring to FIG. 7, the chute 11 is a T-shaped groove; the chute 11 includes a longitudinal groove 112 and a transverse groove 111 located on a top of the longitudinal groove 112; the sliding plate 6 is slidably provided in the transverse groove 111; at least two of the fourth rollers 44 are supported on a first bottom wall 1111 of the transverse groove 111 on one side of the longitudinal groove 112, and at least the other two of the fourth rollers 44 are supported on a second bottom wall 1112 of the transverse groove 111 on the other side of the longitudinal groove 112. In this way, the sliding plate 6 is connected to the door body 2. When the door body 2 moves along the chute 11, the sliding plate 6 can also slide along the chute 11. The chute 11 is the T-shaped groove. The sliding plate 6 is filled in the transverse groove 111 on the chute 11. The bottom of the sliding plate 6 is slidably provided on the first bottom wall 1111 and the second bottom wall 1112 of the transverse groove 111 through the fourth roller 44. In this way, when the door body 2 moves along the chute 11, the sliding plate 6 can move to a position to be filled in the chute 11, such that a vehicle can cross the chute 11.

In an embodiment, a top surface of the sliding plate 6 is flush with the ground 1, such that the vehicle can cross the chute 11 through the sliding plate 6. In an embodiment, the sliding plate 6 is horizontally disposed.

Further, referring to FIG. 5, in a specific implementation of the soundproof door system provided in the present disclosure, the soundproof door system further includes a baffle 7. The baffle 7 is detachably fixed on the top of the door body 2, and a top of the baffle 7 bends towards one side of the door body 2. In this way, the baffle 7 can block some of sound waves above the top of the door body 2, and the bent baffle 7 can guide the sound wave to change a propagation direction.

In an embodiment, the top of the door body 2 is provided with a U-shaped cavity 23, and the bottom of the baffle 7 is inserted into the cavity.

Figure 2:
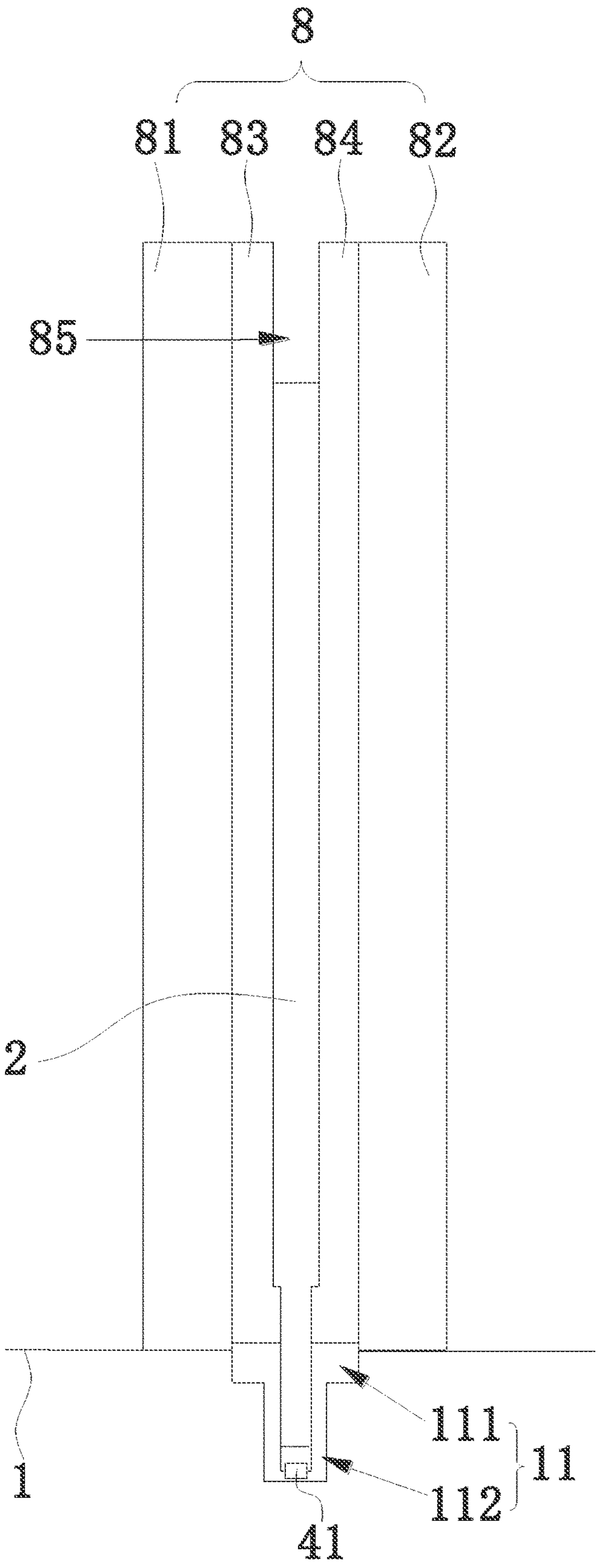
FIG. 2 is a right view of a door body and the soundproof wall in FIG. 1 according to an embodiment of the present disclosure.

Further, referring to FIG. 1 and FIG. 2, in a specific implementation of the soundproof door system provided in the present disclosure, the soundproof door system further includes two soundproof walls 8 sequentially disposed at intervals along the extension direction of the chute 11, where a distance between the two soundproof walls 8 is less than the length of the door body 2. Referring to FIG. 2, each of the sound barrier walls 8 includes a first wall 81 and a second wall 82 that are disposed opposite to each other, a first rubber layer 83 laid on a side of the first wall 81, and a second rubber layer 84 laid on a side of the second wall 82. The first rubber layer 83 and the second rubber layer 84 are disposed opposite to each other to form a gap 85 for embedding the door body 2. In this way, when the door body 2 is embedded between the first rubber layer 83 and the second rubber layer 84, the first rubber layer 83 and the second rubber layer 84 can make less noise pass through.

Figure 3:
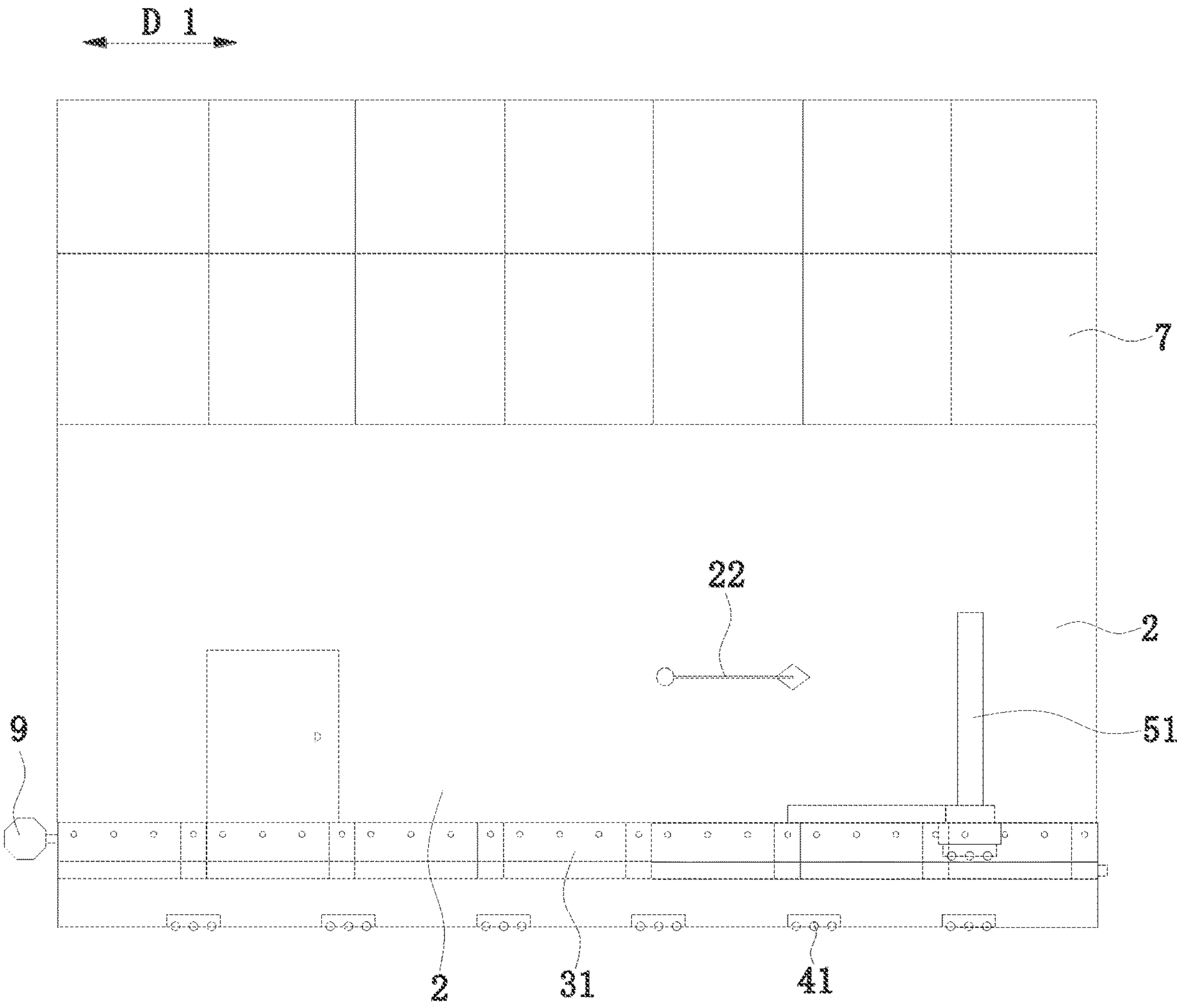
FIG. 3 is a front view of a door body in FIG. 1 according to an embodiment of the present disclosure.

Further, referring to FIG. 3, in a specific implementation of the soundproof door system provided in the present disclosure, the soundproof door system further includes:

a driver 9 configured to drive the door body 2 to move along the chute 11, where the driver 9 is disposed on the ground 1.

In an embodiment, the driver 9 includes: a motor, a screw rod in transmission connection with the motor, and a female seat disposed on the door body 2 and in threaded connection with the screw rod. An extension direction of the screw rod is parallel to the extension direction of the chute 11. In this way, the motor drives the screw rod to rotate, the screw rod drives the female seat to move, and the female seat drives the door body 2 to move along the chute 11.

In an embodiment, the motor is an electromotor, and a torque of the electromotor is 100 to 400 Nm.

In an embodiment, the door body 2 is further provided with a sound level meter 22. In an embodiment, the sound level meter 22 is foldable. When the door body 2 is opened, the sound level meter 22 is folded up, and when the door body 2 is closed, the sound level meter 22 is opened. In an embodiment, the door body 2 is provided with a folding mechanism, and the sound level meter 22 is fixed on a folding piece. When the door body 2 is opened, the folding piece is folded up, and when the door body 2 is closed, the folding piece is opened. After being opened, the sound level meter 22 is at least 1 m away from the wall 81, and is at least 1.2 m above the ground, to meet requirements of noise measurement points at a boundary in relevant standards. In addition, the sound level meter 22 has an all-weather online monitoring function, which can monitor a noise level at the boundary outside the door body 2 in real time and upload the noise level to a data platform.

The above are only preferred implementations of the present disclosure. It should be noted that several improvements and replacements may further be made by a person of ordinary skill in the art without departing from the technical principle of the present disclosure, and such improvements and replacements should also be deemed as falling within the protection scope of the present disclosure.

The invention claimed is:

1. A soundproof door system, comprising:

a chute (11) formed on a ground (1), wherein the chute (11) extends along an extension direction (D1) of a first horizontal straight line;

a door body (2), wherein a bottom of the door body (2) is inserted into the chute (11) and able to slide along the chute (11), and a top of the door body (2) is above the ground (1);

a first roller (41) disposed on the bottom of the door body (2) and supported on a bottom wall of the chute (11);

a first soundproof plate (31) provided with a first end (311) connected to the door body (2) and a second end (312) abutting against an inner wall of the chute (11); and a second soundproof plate (32) provided with a third end (321) connected to the door body (2) and a fourth end (322) abutting against the inner wall of the chute (11); wherein in an extension direction (D2) of a second horizontal straight line perpendicular to the extension direction (D1) of the first horizontal straight line, the first soundproof plate (31) and the second soundproof plate (32) are respectively located on two sides of the door body (2);

wherein the first soundproof plate (31) comprises: a plurality of first sub-plates (313) arranged along an extension direction of the chute (11) sequentially and connected end to end sequentially; for any two adjacent ones of the first sub-plates (313), one first sub-plate (313) is provided with a first protrusion (3131), and the other first sub-plate (313) is provided with a first recess (3132); and the first protrusion (3131) is inserted on the first recess (3132).

2. The soundproof door system according to claim 1, wherein the door body (2), the first soundproof plate (31), and the second soundproof plate (32) each extend along an extension direction of the chute (11).

3. The soundproof door system according to claim 2, wherein the door body (2), the first soundproof plate (31), the second soundproof plate (32), and the inner wall of the chute (11) enclose a sealing space.

4. The soundproof door system according to claim 1, wherein both the first soundproof plate (31) and the second soundproof plate (32) are rubber plates.

5. The soundproof door system according to claim 1, wherein the second soundproof plate (32) comprises: a plurality of second sub-plates (323) arranged along the extension direction of the chute (11) sequentially and connected end to end sequentially; for any two adjacent ones of the second sub-plates (323), one second sub-plate (323) is provided with a second protrusion (3231), and the other second sub-plate (323) is provided with a second recess (3232); and the second protrusion (3231) is inserted on the second recess (3232).

6. The soundproof door system according to claim 1, further comprising:

a first support (51) disposed on the door body (2);

a second support (53) disposed on the door body (2);

a first slide rail (52) disposed on the ground (1);

a second slide rail (54) disposed on the ground (1);

a second roller (42) disposed on a bottom of the first support (51) and slidably provided on the first slide rail (52); and a third roller (43) disposed on a bottom of the second support (53) and slidably provided on the second slide rail (54); wherein in the extension direction (D2) of the second horizontal straight line perpendicular to the extension direction (D1) of the first horizontal straight line, the first support (51) and the first slide rail (52) are located on one side of the door body (2), and the second support (53) and the second slide rail (54) are located on the other side of the door body (2).

7. The soundproof door system according to claim 1, further comprising:

a sliding plate (6) connected to one end of the door body (2) and disposed along the chute (11); and a plurality of fourth rollers (44) disposed at a bottom of the sliding plate (6); wherein the chute (11) is a T-shaped groove; the chute (11) comprises a longitudinal groove (112) and a transverse groove (111) located on a top of the longitudinal groove (112); the sliding plate (6) is slidably provided in the transverse groove (111); at least two of the fourth rollers (44) are supported on a first bottom wall (1111) of the transverse groove (111) on one side of the longitudinal groove (112), and at least the other two of the fourth rollers (44) are supported on a second bottom wall (1112) of the transverse groove (111) on the other side of the longitudinal groove (112).

8. The soundproof door system according to claim 1, further comprising:

a baffle (7) detachably fixed on the top of the door body (2), wherein a top of the baffle (7) bends towards one side of the door body (2).

9. The soundproof door system according to claim 1, further comprising:

two soundproof walls (8) sequentially disposed at intervals along an extension direction of the chute (11), wherein a distance between the two soundproof walls (8) is less than a length of the door body (2), wherein each of the soundproof walls (8) comprises: a first wall (81) extending along the extension direction (D1) of the first horizontal straight line, a second wall (82) extending along the extension direction (D1) of the first horizontal straight line, a first rubber layer (83) laid on a side of the first wall (81), and a second rubber layer (84) laid on a side of the second wall (82); in the extension direction (D2) of the second horizontal straight line, the first wall (81), the first rubber layer (83), the second rubber layer (84), and the second wall (82) are sequentially disposed; and in the extension direction (D2) of the second horizontal straight line, a gap (85) is formed between the first rubber layer (83) and the second rubber layer (84) to clamp the door body (2).

10. The soundproof door system according to claim 1, further comprising:

a driver (9) configured to drive the door body (2) to move along the chute (11), wherein the driver (9) is disposed on the ground (1).

* * * * *